United States Patent [19]

del Ser González

[11] 4,096,794

[45] Jun. 27, 1978

[54] OLIVE PITTER AND STUFFER

[76] Inventor: Clemente del Ser González, Villaverde Alto Paseo de Talleres No. 5, Madrid, Spain

[21] Appl. No.: 567,811

[22] Filed: Apr. 15, 1975

[30] Foreign Application Priority Data

Oct. 28, 1974 Spain .................................... 431.436

[51] Int. Cl.² ............................................. A23N 4/08
[52] U.S. Cl. ....................................... 99/494; 99/547; 99/563
[58] Field of Search ...................... 99/450.1, 494, 552, 99/547, 562, 563, 565; 426/484, 485

[56] References Cited

U.S. PATENT DOCUMENTS

| 667,423 | 2/1901 | Brown | 99/494 |
|---|---|---|---|
| 1,502,929 | 7/1924 | Tuttle | 99/494 |
| 2,567,590 | 9/1951 | Ashlock | 99/494 |
| 2,609,853 | 9/1952 | Smith | 99/494 |
| 2,643,694 | 6/1953 | Ashlock | 99/494 |
| 2,681,089 | 6/1954 | Francisco | 99/494 |
| 2,991,813 | 7/1961 | Wilms | 99/494 |

*Primary Examiner*—Billy J. Wilhite
*Attorney, Agent, or Firm*—Huebner & Worrel

[57] ABSTRACT

An olive pitter and stuffer comprising a machine structure which includes two sets of pitting plungers disposed along one side each of respective chains for carrying the olives into alignment with these plungers. On the other side of each chain is an olive-opening device aligned with the pitting plunger for cutting an opening through which the pit is ejected by the plunger. The olives are then transported by the plunger to a pair of stations at which mechanisms maintain the opening of the olives while further plungers insert respective stuffings in the olives. According to the invention, a pair of mechanisms are provided with respective chains, all operated by a synchronous drive so that the output of the machine is doubled.

6 Claims, 16 Drawing Figures

OLIVE PITTER AND STUFFER

The invention relates to a machine for pitting and stuffing olives.

The key feature of the invention is that two mechanisms are provided for synchronous operation to double the output of the machine, each mechanism comprising pitting and stuffing devices synchronized with each other and connected by common transmissions with the drive motor.

In the Drawing:

FIG. 2b is a fragmentary vertical section of a stuffing portion of the machine taken in a plane substantially parallel to the plane of FIG. 2a;

FIG. 6b is a vertical section taken on line 6b—6b of FIG. 6a;

Figure 1:
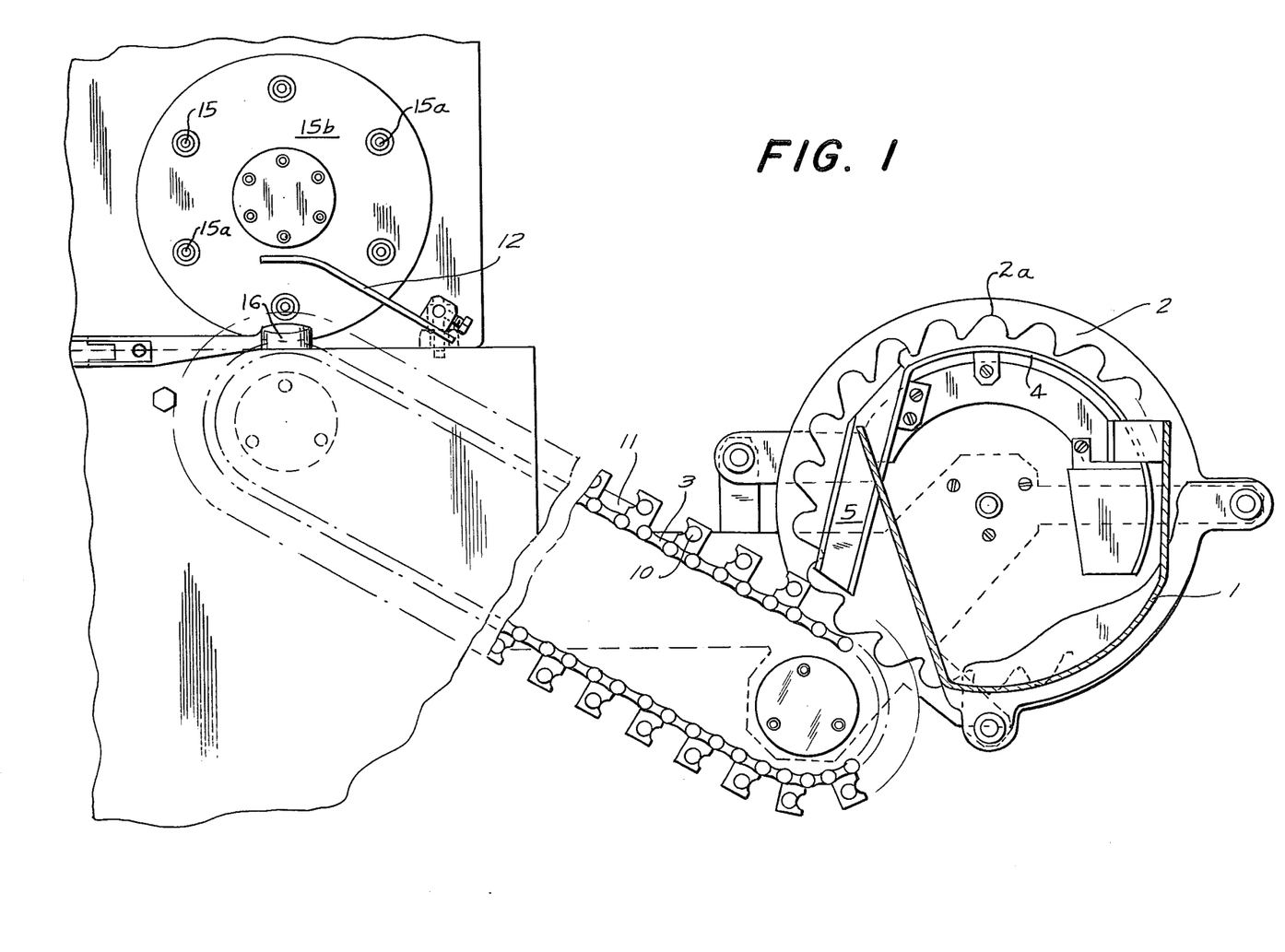
FIG. 1 shows in front elevation, partially in vertical section, one of the olive-feeding devices with its selecting disk and chain conveyor.

FIG. 1 shows a double hopper 1 receiving the olives and provided with a pair of disks, only one of which is represented at 2, whose pockets 2a pick up individual olives, not shown, and entrain them along an arcuate guide 4 to a chute 5 from which the olives drop, in succession, upon respective feed chains 3. Two such feed chains are provided although only one can be seen in FIG. 1.

Figure 2A:
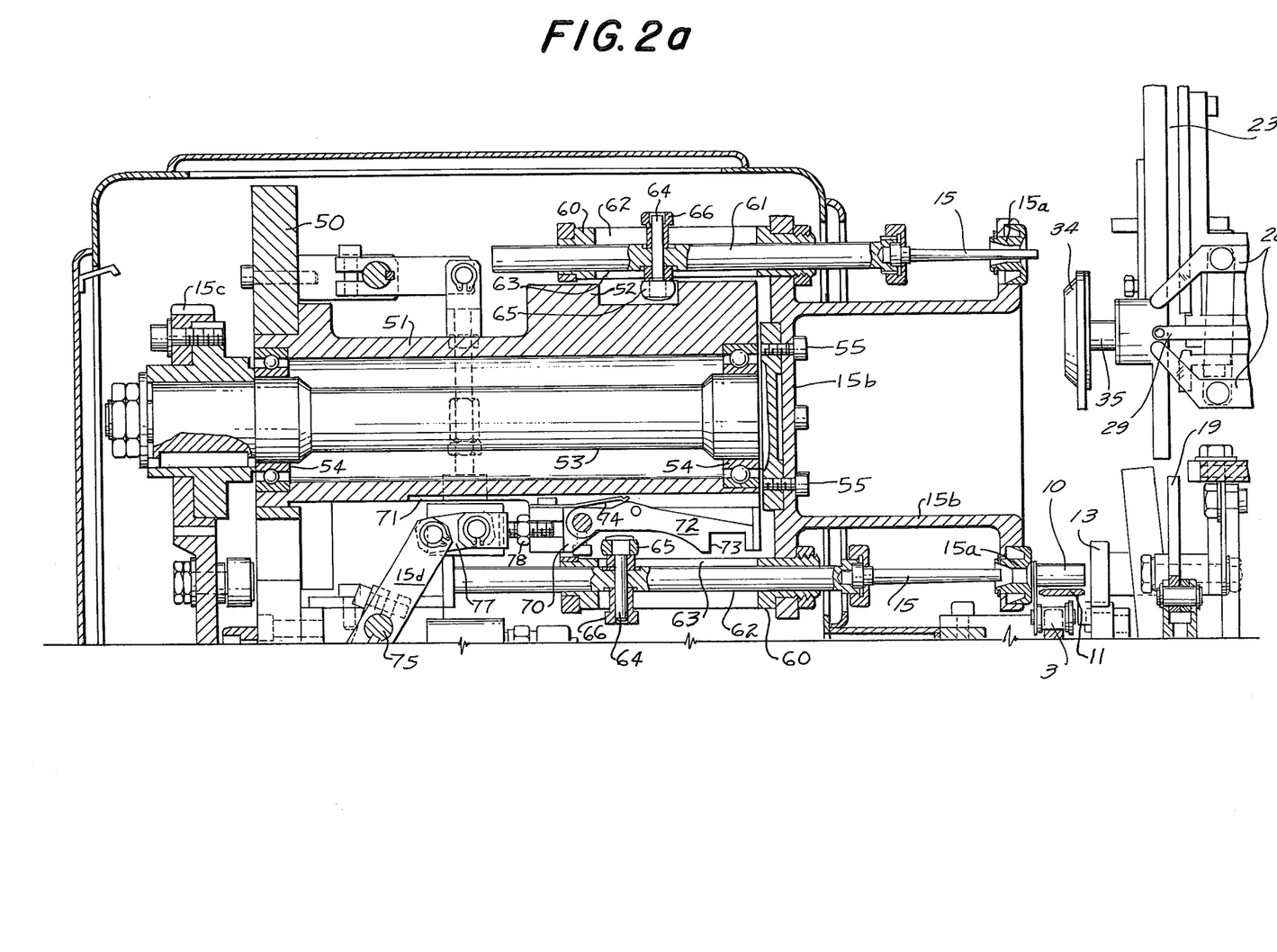
FIG. 2a is a vertical axial section of the machine.

Each feed chain 3 comprises seats for the individual olives which are carried onto a guide surface 11 (see also FIG. 2a) so that they arrive at the bushing 15a of the pitting plunger or punch 15 in proper position. A brush 12 holds each olive in its pitting position on a support 16. As shown in FIGS. 1 and 2a, the chains 3 have transverse flight bars 10 to push the olives upwardly over the surface 11 to the support.

Figure 2B:
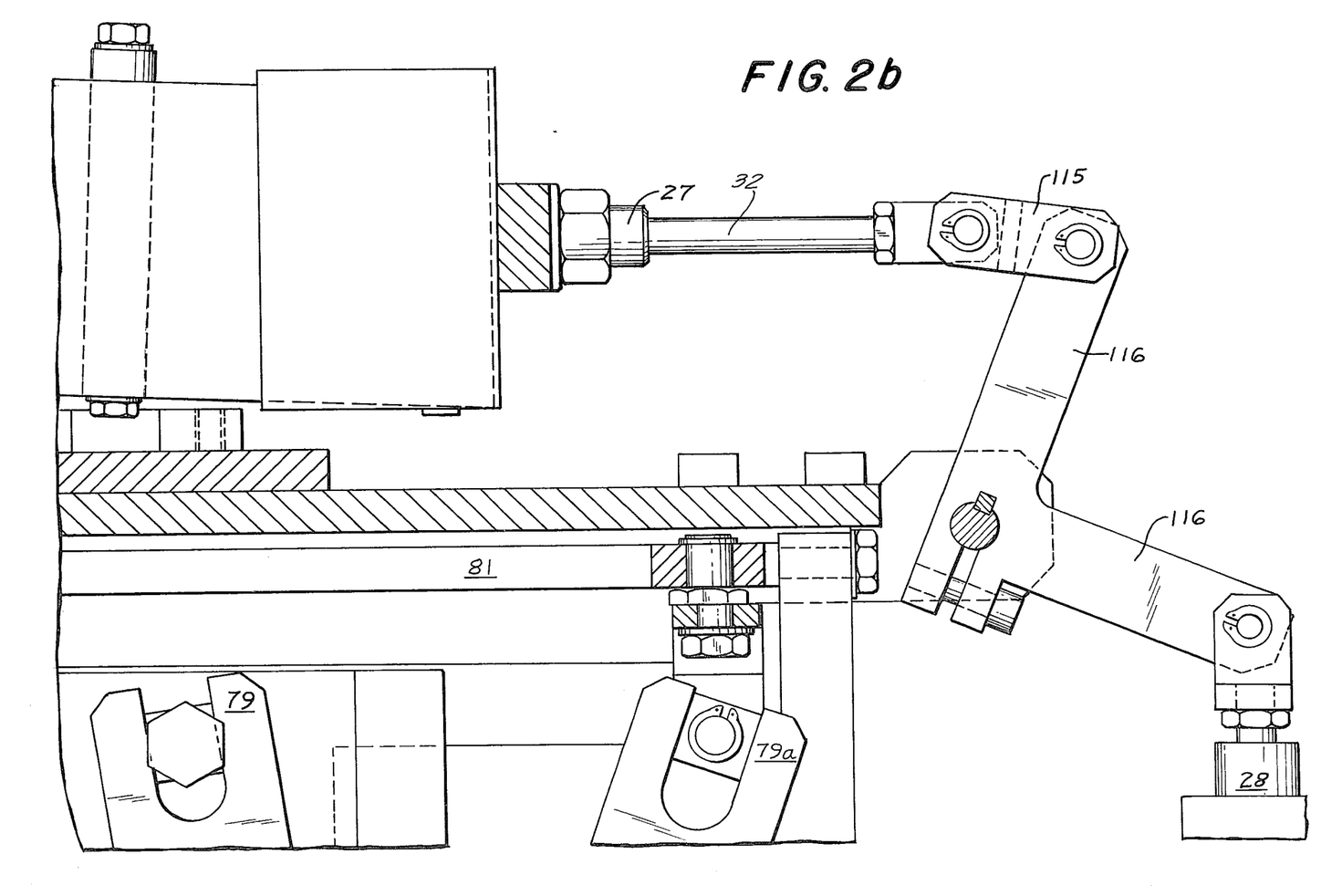
Figure 2C:
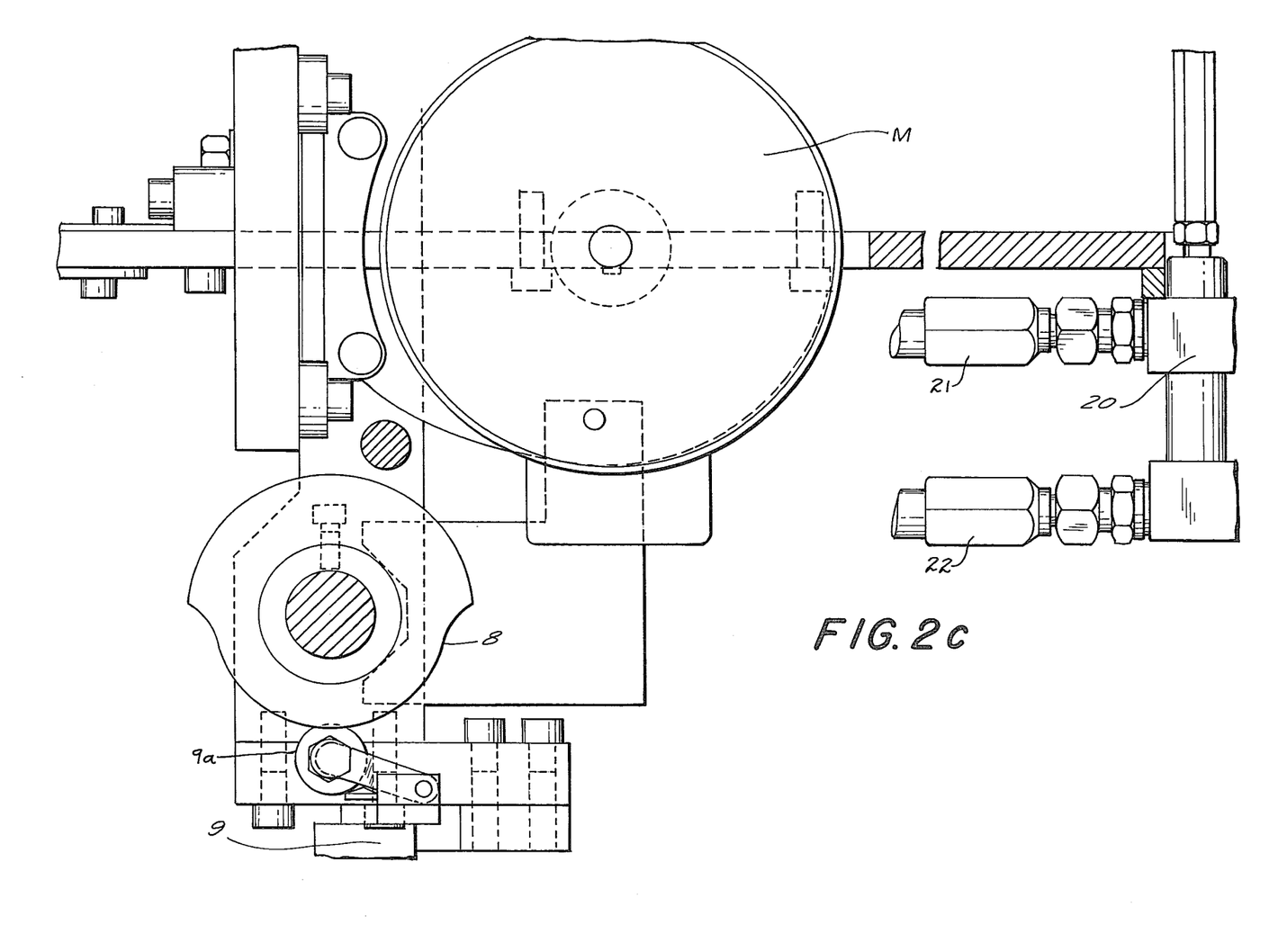
FIG. 2c is a fragmentary vertical section of the drive system of the machine.
Figure 2D:
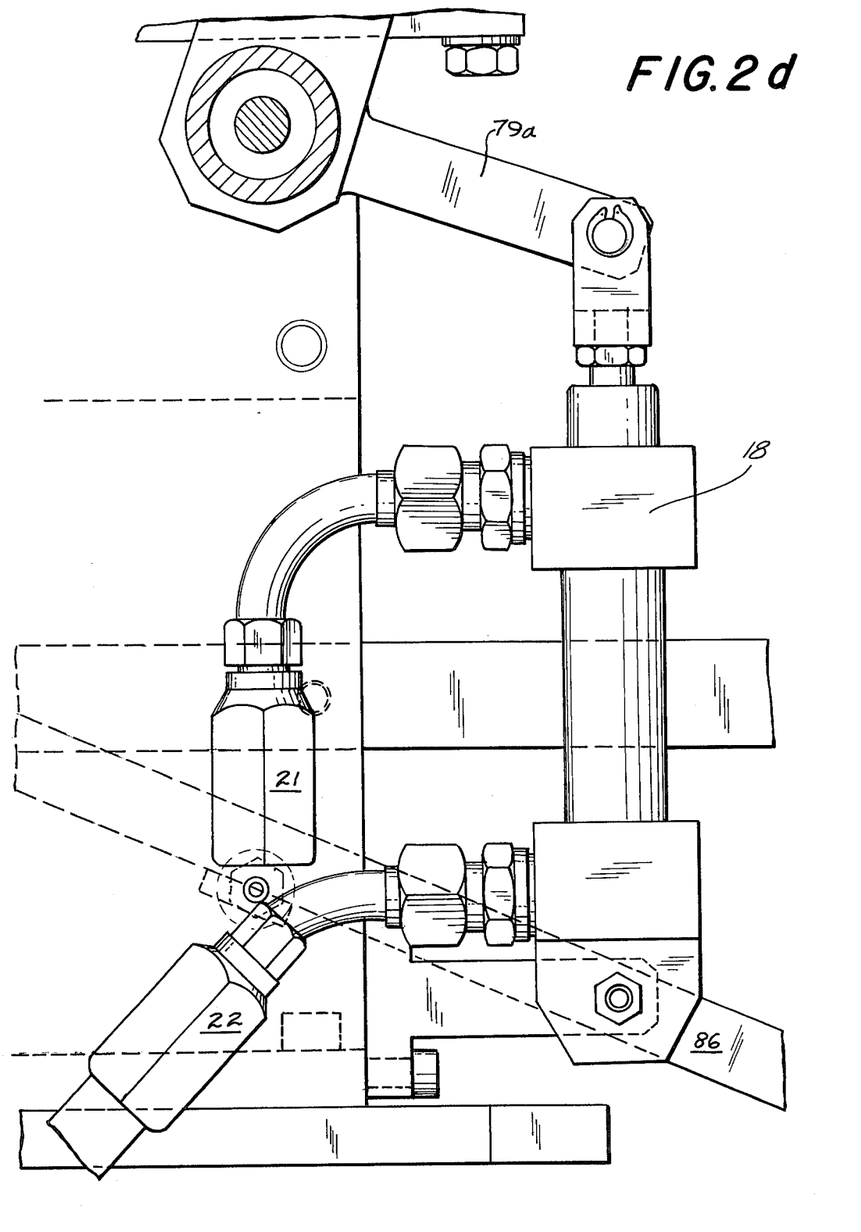
FIG. 2d is a fragmentary vertical section of a coring knife operating system.
Figure 3A:
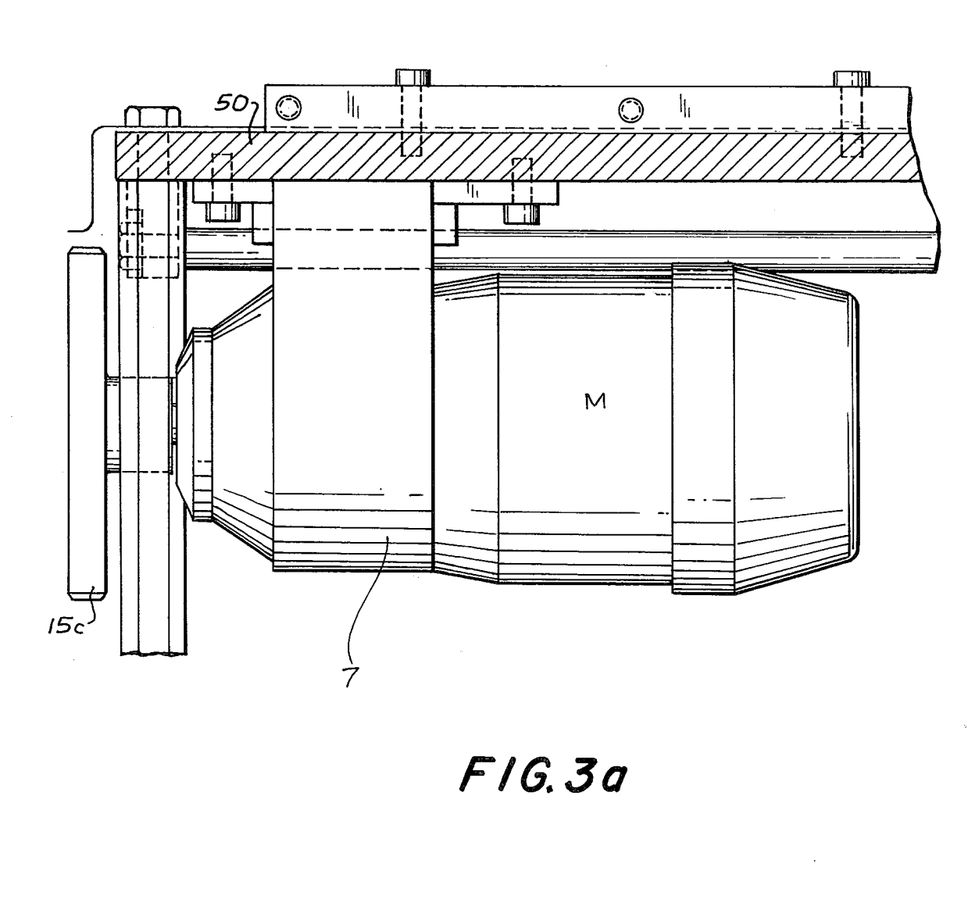
FIGS. 3a and 3b show the drive system for the machine in plan view.
Figure 3B:
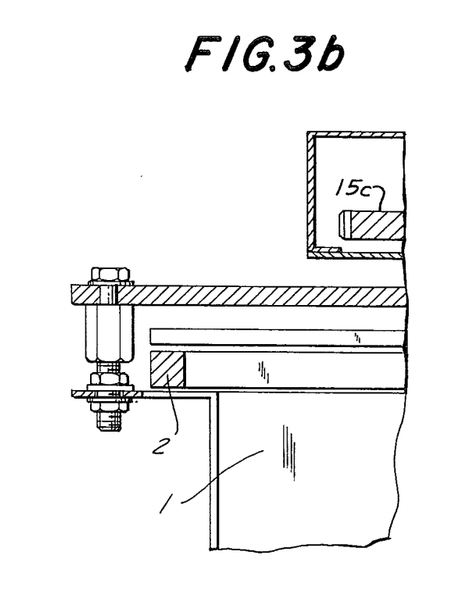

The disks 2 and the chains 3 are driven by a common motor M (see FIGS. 2c and 3a).

As can also be seen from FIG. 1, each of the two sets of pitting devices comprises a turn table 15b carrying the bushings 15a and their respective plungers or punches 15.

Referring in greater detail to FIG. 2a, a frame 50, of any suitable form is provided having an elongated block 51 mounted therein. The block is circumscribed by a camway 52. A shaft 53 is journaled in the block coaxially of the table 15b on bearings 54. The turn table is mounted on the shaft to rotate therewith by cap bolts 55.

Figure 6A:
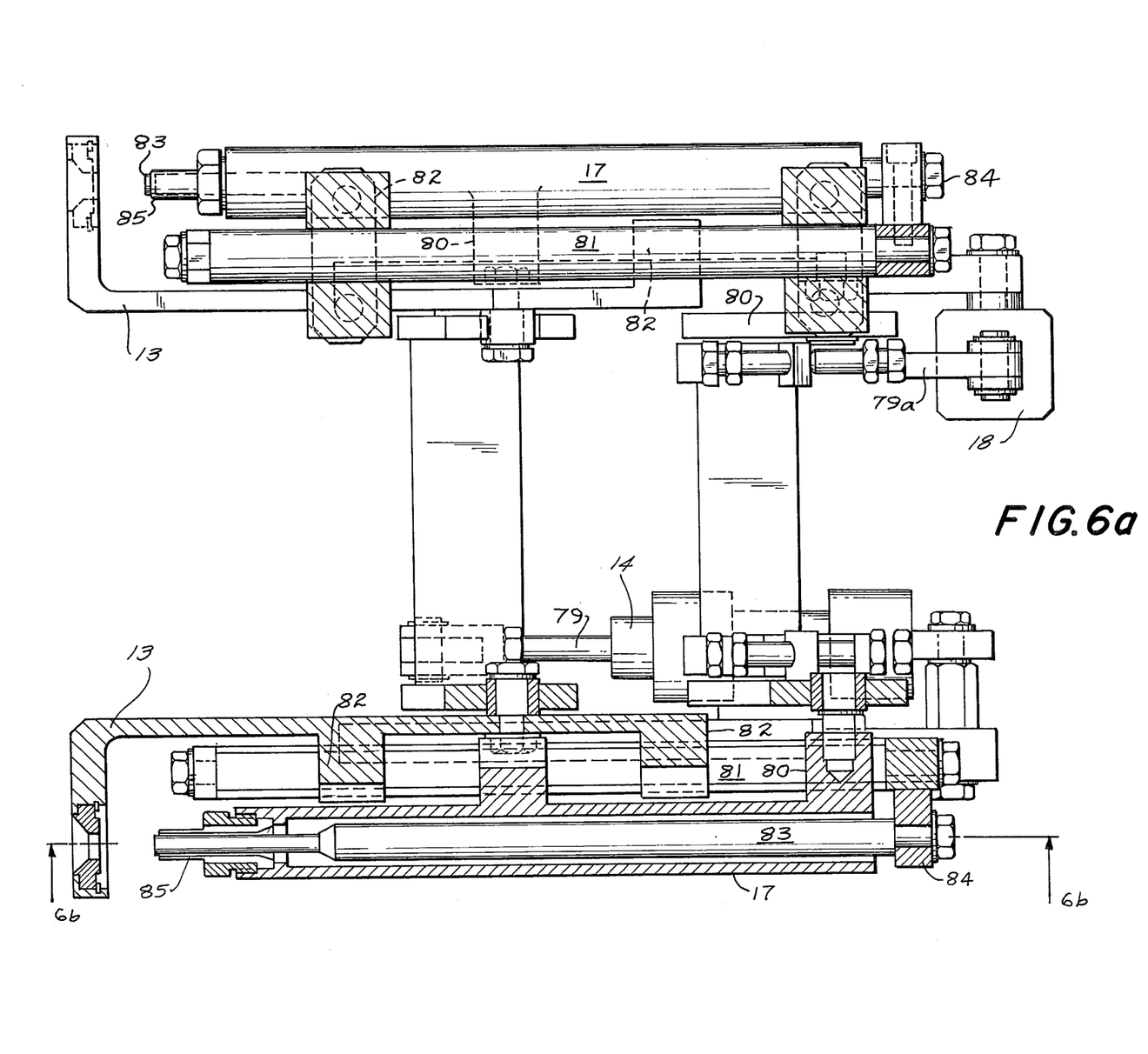
FIG. 6a is a horizontal section through a portion of the pitting system of the present invention.
Figure 6B:
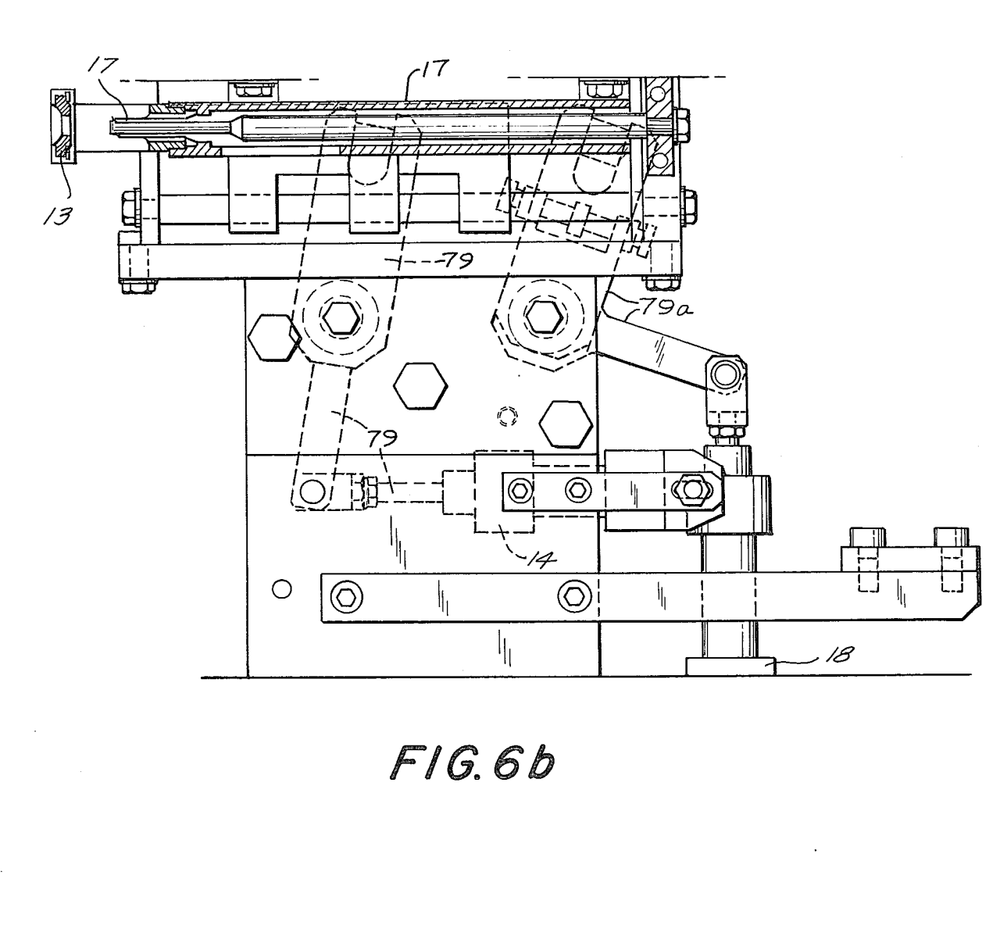
Figure 6C:
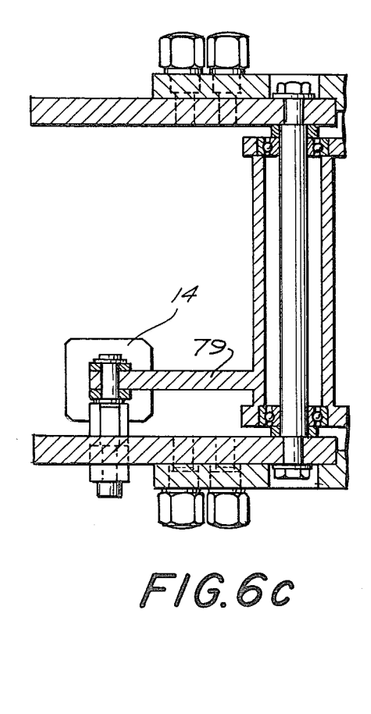
FIG. 6c is a fragmentary vertical section of a portion of the pitting system shown in FIG. 6b.

As shown in FIGS. 2a, 6a and 6b, a cylindrical guide 60 is mounted in the turn table 15b in alignment with each bushing 15a and revolves with the turntable. A rod 61 is slidably mounted in each guide for reciprocal movement therein and connected to a respective pitting plunger 15. Each guide is longitudinally slotted at 62 and 63. An arm 64 rigid with each rod is extended outwardly through its respective slot 62 and inwardly through its respective slot 63. The inner end of each arm mounts a cam follower 65 within the camway 52. The outer end of each arm mounts a slide 66 slidably engaged in the slot 62. It will be obvious that as the turntable 15b is rotated, the plungers 15 are extended through the bushings and retracted therein by the follower 65 traveling in the camway 52.

A block 70 is mounted in a channel 71 for reciprocal movement longitudinally of the block 51. A positioning finger 72 is pivotally mounted on the block 70 for movement inwardly and outwardly of the block 51. The finger has a downwardly disposed notch 73 disposed to receive the followers 65 and a leaf spring 74 is provided to urge the extended end of the finger downwardly. The finger provides a concave camming surface disposed toward the followers. A rocker shaft 75 is mounted in the frame 50, has a reciprocating lever 15d extended therefrom and a toggle link 77 and length adjusting fitting 78 interconnected the level and the slide block.

In FIG. 2a it is possible to see that each plunger 15 can be thrust through its respective bushing 15a to retain an olive thereon and transport the olive into the stuffing station which is provided with a retainer 34 adapted to hold the opening in the olive open to receive the stuffing pepper. The gearing 15c for rotating each turntable 15b is also operated by the motor M while pneumatic rams, not shown but suitably of the form shown at 14, 18, 20, 28 and 40 displace the levers 15d for axially displacing the plungers 15 when electromatic valves 9 (FIG. 2c) are operated by cams 8 driven by the motor M. Thus, the movements of the two pitting mechanisms are synchronized.

As shown, the cams 8 operate their respective valves 9 through followers 9a to open and close the same so that their associated rams are positively extended or contracted by fluid pressure applied through one of the conduits 21 and 22 while the ram is bled through the opposite conduit.

As is also apparent from FIG. 2a, each pitting station is provided with a seat 13 which can be displaced by the pneumatic ram 14 (FIG. 6a) through a linkage 79 to hold the olive in place while a coring tube 17 (FIGS. 6a and 6b) is shifted by another ram 18 through a linkage 79a to pierce the olive and permit the pit to be driven out of the latter by the plunger 15. The pits descend chutes 86.

Referring to FIGS. 6a and 6b, a coring tube 17 is aligned with each bushing 15a and plunger 15 when at the pitting station. The coring tube is supported for longitudinal reciprocal movement in such alignment by brackets 80 slidably mounted on a guide 81 supported in the frame 50 by brackets 82. A punch 83 is rigidly mounted in the frame at 84 and extended longitudinally of the coring tube. A coring knife 85 is slidably fitted to the extended end of the punch, connected to the coring tube and extended therefrom toward the pitting station. As will be obvious in FIG. 6a, when the coring tube 17 and knife 85 are slid toward the pitting station, the knife is extended from the punch. When they are retracted from the pitting station, the knife moves backwardly on the fixed punch to eject any contents from the knife left by the coring operation.

A rocker arm 19 (FIG. 2a) is actuated by a ram 20 (FIG. 2c) to sweep in front of knife 85 and clean the latter from portions of the olive which may adhere.

As can best be seen in FIG. 6a, the two assemblies for opening the olive are actuated by common rams 14 and 18 synchronously.

The stuffing mechanism is provided separately for each pitting mechanism and comprises a retainer 34 having an injection or stuffing tube 35 controlled by a ram 40 operated by the cam 41 (FIGS. 2a, 5b and 7b) to hold open the olive until the stuffing material, e.g. pepper, is introduced. As can be seen from FIG. 7b, both of the retainers are operated by common actuating mechanism.

Figure 5A:
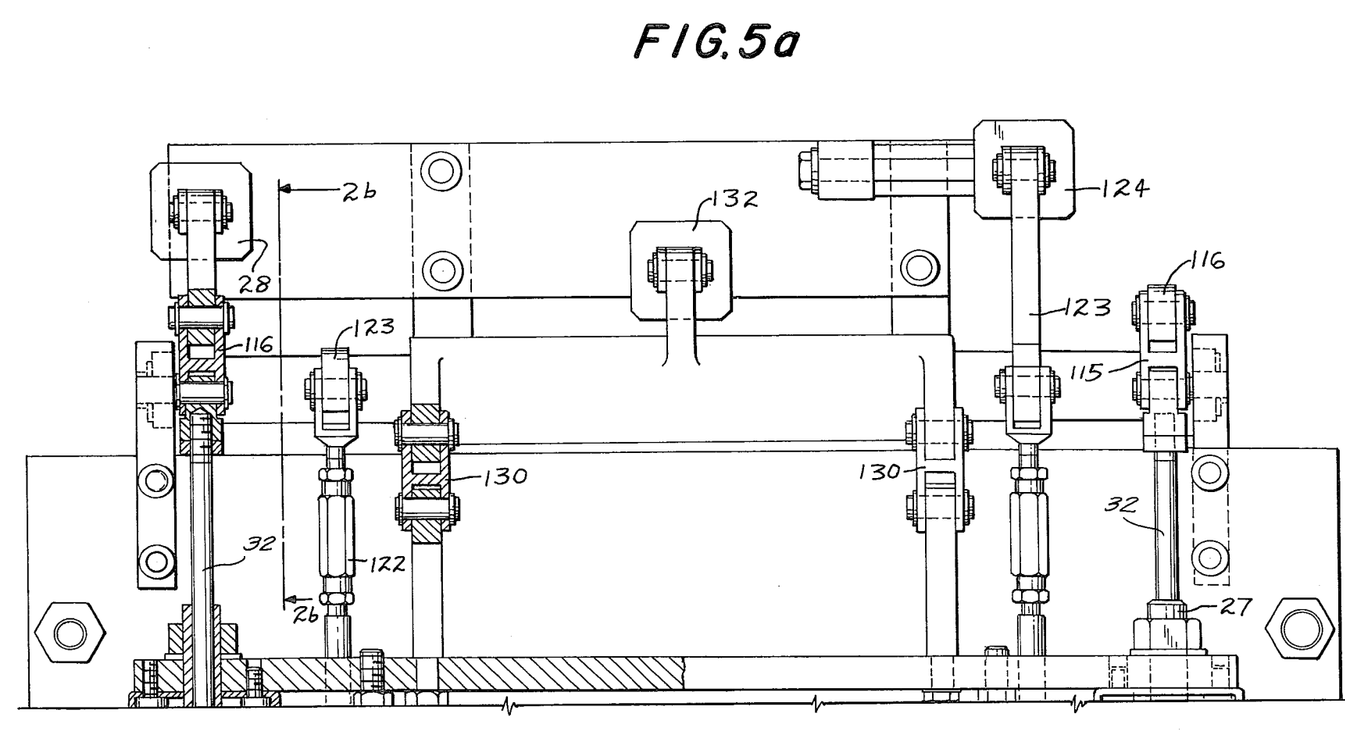
FIGS. 5a and 5b are horizontal sections of the pepper-feeding system.
Figure 5B:
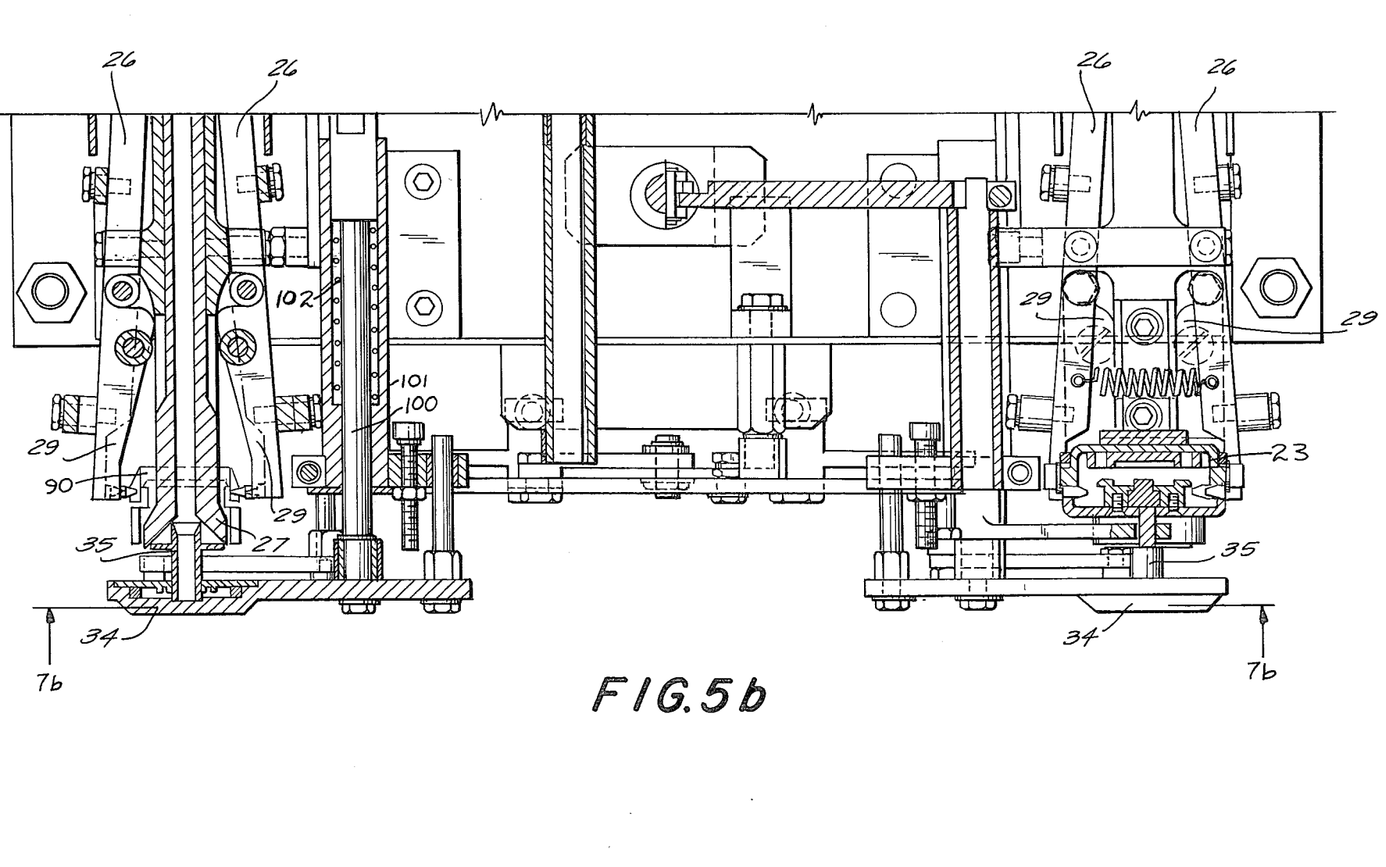

As shown in FIG. 5b, each retainer is mounted for reciprocal horizontal movement by a mounting shaft 100, slidably received in a bearing 101 and spring loaded at 102 internally of the bearing resiliently to resist movement of the retainer away from the stuffing station.

Figure 4:
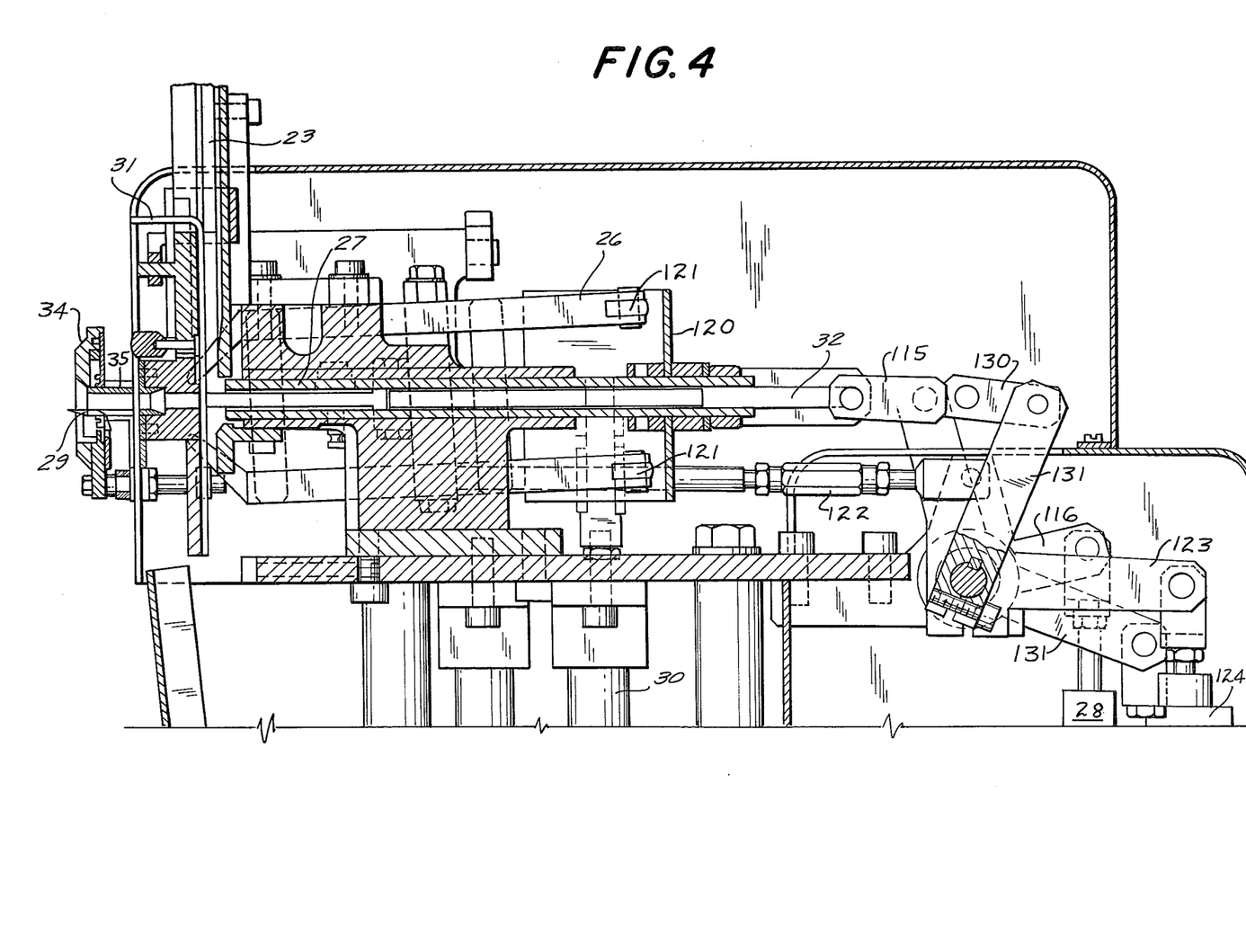
FIG. 4 is a vertical section of a pepper feeding system of the machine.
Figure 7A:
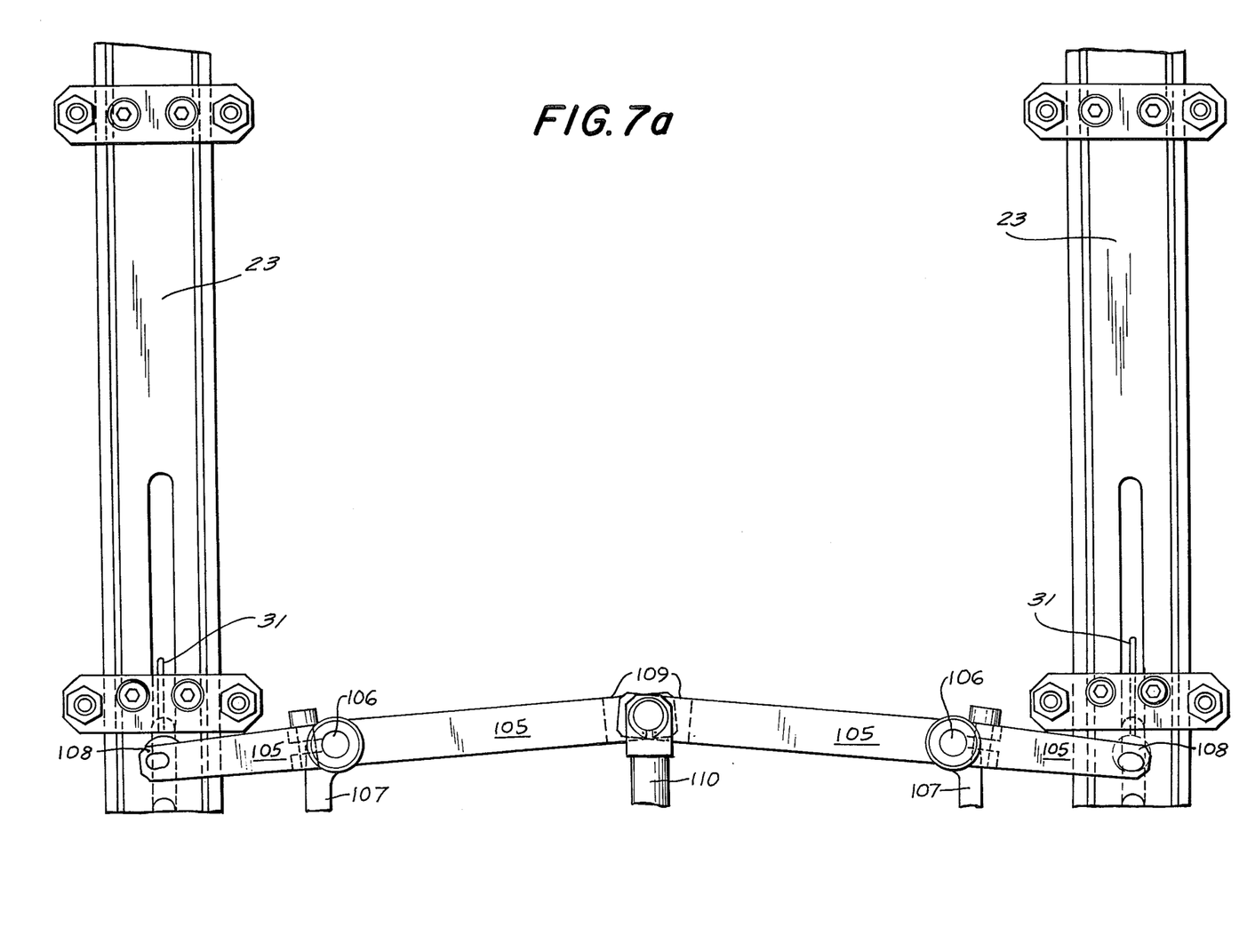
FIG. 7a is a fragmentary rear elevation of a stuffing feeding mechanism of the machine.
Figure 7B:
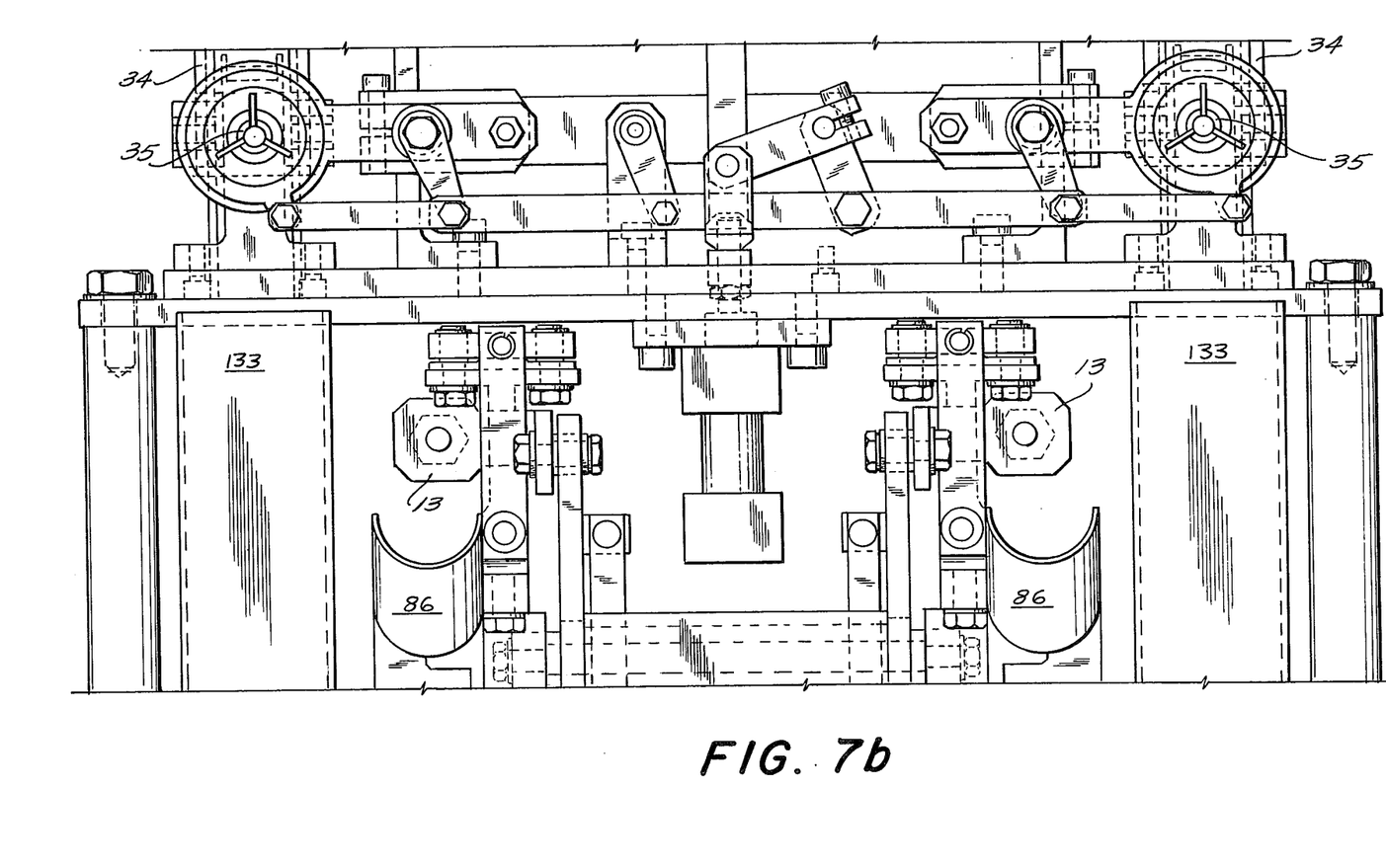
FIG. 7b is a vertical section taken on line 7b—7b in FIG. 5b.

Referring to FIGS. 7a and 5b, a guide 23 is upwardly extended from each stuffing station. Each is of channel form and is adapted to receive a magazine 90 (FIG. 5b) containing stuffing material. A stuffing tube 35 is extended through each retainer 34, as seen in FIGS. 4 and 5b. The guide 27 is tubular and registers with the stuffing tube 35. A plunger 32 is mounted for reciprocal longitudinal movement in the tube.

The stuffing material is supplied through a guide 23, being folded by levers 26 about the pin 31 evident in FIGS. 4 and 7a. The guide positions the peppers ahead of a plunger 32 received in a guide 27 which registers with the injection tube 35 and is actuated by the ram 28 to drive the pepper into the olive. The stuffing material is indexed downwardly to the holder by arms 105 pivoted at 106 on supports 107 provided in the frame 50. The arms have distal ends which have feeding elements 108 in the guides 23 and inner ends 109 which are pivotally connected to a positioning arm 110. Plunger 15 retaining the olive in position during the stuffing process is synchronously retracted.

Upon retraction, the stuffed olives are released to descend the chutes 133. The plunger is connected through a toggle link 115 and a bell crank 116 to its respective control ram 28, as shown in FIGS. 2b, 4 and 5a.

In the same figures, it will be seen that a lever positioning slide 120 is mounted for reciprocal movement adjacent to the levers 26 and is engaged by rollers 21 on said levers. An adjustable link 122 interconnects the slide 120 and a bell crank 123 which in turn is connected to a control ram 124.

Still referring to FIGS. 2b, 4 and 5a, a pepper folding linkage includes a toggle link 130, and a bell crank 131 connected to control ram 132.

Figure 7C:
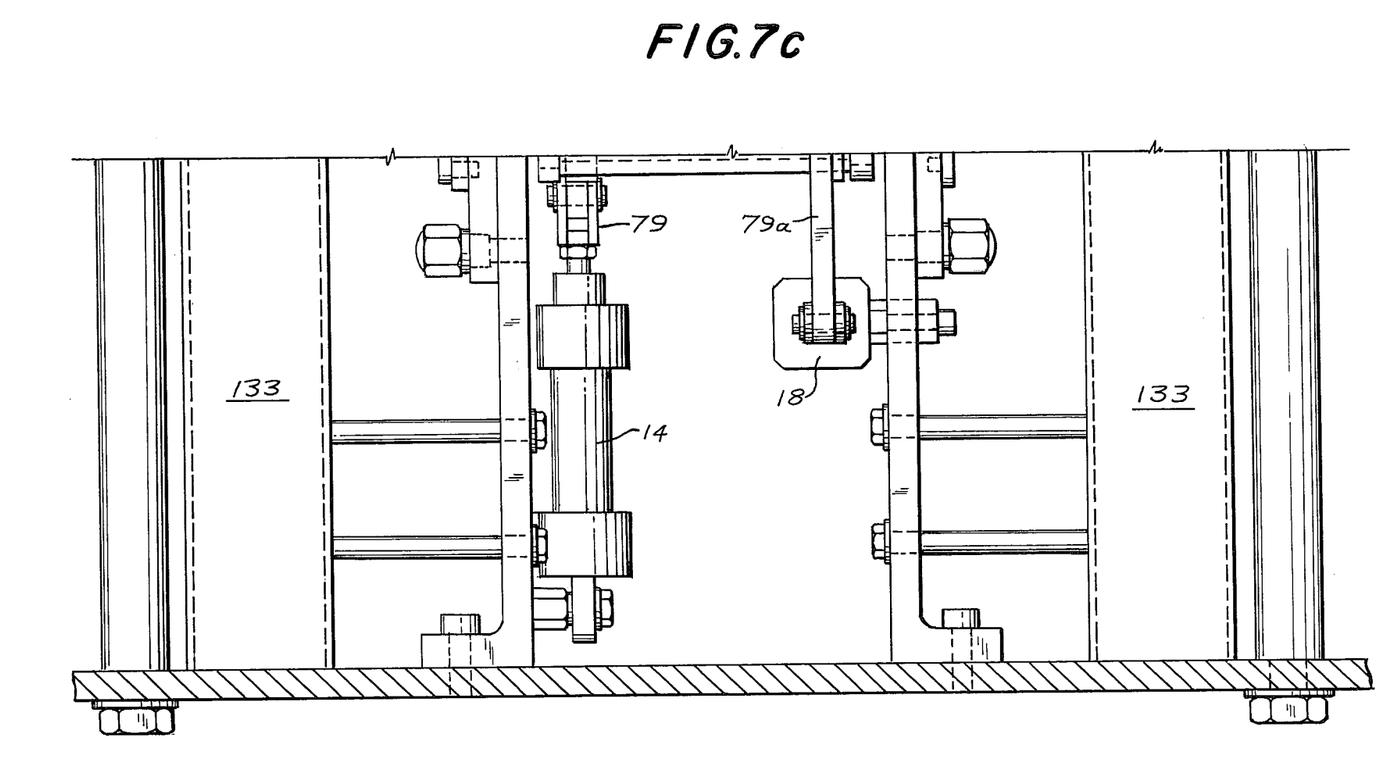
FIG. 7c is a fragmentary vertical section of a portion of the actuating system of the present invention.

The pepper-feed devices are likewise doubled (FIGS. 7a and 7c) but are actuated in common. The motor M has an a gear reducer 7 as best shown in FIG. 3a.

OPERATION

The operation of the described embodiment of the present invention is believed to be clearly apparent and is briefly summarized at this point. As the disk 2 is rotated by the motor M, the pockets 2a pick up olives in the hoppers, carry them over the guide 4 and deposit them through the chute 5 onto the chain 3. The flight bars 10 draw the olives over the surface 11 to the pitting station where they are successively rested on the support 16 and held in position by the brush 12. The seat 13 is then advanced by the ram 14 to center the olive and to prepare it for insertion of the coring knife 85 by actuation of the rams 18 and to resist the thrust of the plungers 15 when they are actuated by the lever 15d to pit the olives.

While an olive is located in the pitting station, the coring knife 85 is thrust into the olive to form a cavity therein and the plunger 15 thrust into the olive from the opposite side to knock the pit out in the direction of the knife and to impale the olive on the plunger. Of course, before the olive can be advanced from the pitting station, the knife must be retracted by the ram 18 and the seat 13 by the ram 14. As the coring knife is retracted, it slides backwardly over the punch 83 which ejects any pits or other portions of the olives left in the knife. The ram 20 is actuated to sweep in front of the knife 85 and clean the same.

The pitted olive is then carried on the plunger 15, on which it is impaled, to the stuffing station by rotation of the turn table 15b. As evident in FIG. 1, the plunger 15 carrying the pitted olive is advanced three increments before it reaches the stuffing station as three additional olives are successively delivered to the pitting station and pitted.

When an olive reaches the stuffing station, the retainer 34 is advanced to position by the spring (FIG. 5b) by initial actuation of the ram 28, the ram 132 (FIG. 5a) is actuated to fold the pepper, the ram 124 (FIG. 4) is actuated to position the magazine, and the ram 28 (FIGS. 4 and 5a) is actuated to thrust the plunger 32 toward the stuffing station and extrude pepper or other stuffing material through the tube 35 into the cavity in the olive. Subsequently, the rams 28, 132 and 124 are retracted and the turn table 15b rotated to carry the plunger 15 back to the pitting station.

I claim:

1. An olive pitting and stuffing machine comprising hopper means for receiving olives to be pitted;

a pair of olive selection disks rotatable in spaced-apart relation in said hopper means to entrain successive olives thereon;

respective olive-conveying chains assigned to each of said disks and receiving olives in succession therefrom, each of said chains carrying its olives in succession to a respective pitting station;

a pair of turntables in space-apart relationship provided with a set of axially displaceable pitting plungers individually successively positionable at the respective pitting stations in alignment with successive respective olives and being movable successively to respective stuffing stations by rotation of their respective turntables;

a respective olive coring device disposed at each of said pitting stations opposite the respective turntable from its plunger and provided with a tubular knife for cutting an opening in the respective olive for ejection of the pit therethrough by the respective plunger;

a common mechanism for rotating said turntables and axially displacing said plungers to eject the pits at the pitting stations and to impale the olives thereon, to transport the olives to the stuffing stations and ultimately to retract from the olives at their respective stuffing stations;

respective stuffing devices disposed at the stuffing stations opposite each of said turntables from said plungers and each including retainers for retaining successive olives carried by the plungers in an open condition by engagement therewith;

means for inserting stuffing through the retainers in the openings of the respective olives at the stuffing stations; and a common operating mechanism for synchronously operating both said selection disks, chains, sets of plungers, coring devices, rotating means, retainers, and stuffing devices.

2. In a machine for pitting and stuffing olives and the like having a pitting station, a stuffing station, means for delivering olives successively to the pitting station, a tubular coring knife reciprocal to and from successive olives at the pitting station to form cavities individually therein, and stuffing means at the stuffing station operable to deliver stuffing to the cavities of successive olives at the stuffing station wherein the improvement comprises a pitting plunger; means for thrusting the plunger into individual olives at the pitting station to eject pits from the olives and to impale successive individual olives thereon; means for transporting the plunger from the pitting station to the stuffing station with the impaled olives thereon to carry the olives to the stuffing station and for return of the plunger to the pitting station; and means for removing the olives from the plunger at the stuffing station.

3. The improvement of claim 2 in which the plunger is substantially aligned with the coring knife and is opposite to the pitting station therefrom to eject pits from the olives out of the cavities formed by the coring knife.

4. In a machine for pitting and stuffing olives and the like having a pitting station and a stuffing station,
 (A) means for delivering olives successively to the pitting station,
 (B) a punch,
 (C) means to actuate the punch at the pitting station to punch the pits out of successive olives and to impale the olives thereon,
 (D) means to transport the punch with successive olives individually impaled thereon from the pitting station to the stuffing station and return, the actuating means being operable to retract the punch from the olives at the stuffing station, and
 (E) means to stuff successive olives at the stuffing station as the punch is retracted.

5. In a machine for pitting and stuffing olives and the like having a pitting station and a stuffing station in spaced relation,
 (A) means for delivering an olive to the pitting station,
 (B) a hollow coring knife mounted for longitudinal reciprocal movement to and from the pitting station to form a cavity in the olive,
 (C) a hollow stuffing tube mounted for longitudinal reciprocal movement to and from the stuffing station in substantially parallel relation to the knife to stuff the cavity,
 (D) a pitting punch mounted for longitudinal reciprocal movement to and from the pitting station in alignment with the knife and opposite to the pitting station therefrom and for movement in parallelism from the pitting station to the stuffing station,
 (E) means for ejecting stuffing through the tube into the olive when the olive is at the stuffing station, and
 (F) synchronous drive means for sequentially delivering an olive to the pitting station, thrusting the coring knife into the olive in alignment with the pit thereof, thrusting the punch into the olive to eject the pit therefrom and to impale the olive on the punch, withdrawing the knife from the olive to leave a pit cavity therein, moving the punch from the pitting station to the stuffing station and transporting the olive impaled thereon to said stuffing station, inserting the tube into the cavity of the olive at the stuffing station, actuating the ejection means to eject stuffing from the tube into the cavity of the olive, withdrawing the tube from the cavity, withdrawing the punch from the olive, and returning the punch to the pitting station.

6. In a machine for pitting and stuffing olives and the like;
 (A) a predetermined pitting station;
 (B) a predetermined stuffing station in spaced relation to the pitting station;
 (C) means for advancing olives successively to the pitting station;
 (D) a hollow tubular coring knife;
 (E) means mounting the coring knife for reciprocal longitudinal movement to and from the pitting station;
 (F) a pitting punch;
 (G) means mounting the punch in alignment with the knife opposite to the pitting station therefrom for reciprocal endward movement toward and from the knife and travel from the pitting station to the stuffing station and return;
 (H) stuffing delivery means at the stuffing station; and
 (I) synchronous drive means for successively actuating the advancing means to deliver olives successively to the pitting station between the punch and the knife, the knife mounting means to thrust the coring knife into successive olives at the pitting station in alignment with the pits thereof whereby the pits and cored portions of the olives are received in the hollow of the knife, the punch mounting means to thrust the punch into successive olives at the pitting station to eject the pits toward the knife and to impale such successive olives on the punch, the knife mounting means to withdraw the knife from such successive olives leaving cavities therein, the punch mounting means to move the punch from the pitting station to the stuffing station with the successive olives individually impaled thereon, the stuffing delivery means to deliver stuffing to the cavities of successive olives at the stuffing station, and the punch mounting means to withdraw the punch from the successive olives upon receiving stuffing at the stuffing station and to return to the pitting station.

* * * * *

UNITED STATES PATENT AND TRADEMARK OFFICE
CERTIFICATE OF CORRECTION

PATENT NO. : 4,096,794
DATED : June 27, 1978
INVENTOR(S) : Clemente del Ser Gonzalez It is certified that error appears in the above-identified patent and that said Letters Patent are hereby corrected as shown below:

Column 2, line 29, delete "interconnected" and substitute ---interconnect---.

Column 3, line 54, delete "21" and substitute ---121---.

Signed and Sealed this

Twenty-third Day of January 1979

[SEAL]

Attest:

RUTH C. MASON
Attesting Officer

DONALD W. BANNER
Commissioner of Patents and Trademarks